US009171459B2

(12) United States Patent
Yorke et al.

(10) Patent No.: US 9,171,459 B2
(45) Date of Patent: Oct. 27, 2015

(54) TRAFFIC MONITORING AND NOTIFICATION SYSTEM AND ASSOCIATED METHODS

(71) Applicant: Blue-Band LLC, Sanford, FL (US)

(72) Inventors: Kevin Yorke, Deland, FL (US); Roberto Adair, Winter Springs, FL (US); William Waers, Orlando, FL (US); Kendal Yorke, Deland, FL (US)

(73) Assignee: Blue-Band LLC, Orlando, FL (US)

( * ) Notice: Subject to any disclaimer, the term of this patent is extended or adjusted under 35 U.S.C. 154(b) by 0 days.

(21) Appl. No.: 13/859,999

(22) Filed: Apr. 10, 2013

(65) Prior Publication Data

US 2013/0275032 A1 Oct. 17, 2013

Related U.S. Application Data

(60) Provisional application No. 61/623,871, filed on Apr. 13, 2012.

(51) Int. Cl.

| | |
|---|---|
| ***G06F 19/00*** | (2011.01) |
| ***G08G 1/00*** | (2006.01) |
| ***G08G 1/07*** | (2006.01) |
| ***G08G 1/01*** | (2006.01) |

(Continued)

(52) U.S. Cl.

CPC ................ *G08G 1/00* (2013.01); *G08G 1/0116* (2013.01); *G08G 1/0133* (2013.01); *G08G 1/0141* (2013.01); *G08G 1/0145* (2013.01); *G08G 1/052* (2013.01); *G08G 1/08* (2013.01); *G08G 1/096716* (2013.01); *G08G 1/096741* (2013.01); *G08G 1/096775* (2013.01)

(58) Field of Classification Search

USPC .................................. 701/119; 340/902, 905

See application file for complete search history.

(56) References Cited

U.S. PATENT DOCUMENTS 6,129,025 A * 10/2000 Minakami et al. ......... 104/88.01
6,133,854 A * 10/2000 Yee et al. ...................... 340/907

(Continued)

FOREIGN PATENT DOCUMENTS

JP 11101647 * 9/1997

OTHER PUBLICATIONS

"State Highway Administration Research Report" by Stanley E. Young, Feb. 6, 2012. Project No. SP909B4D Final Report.*

*Primary Examiner* — Thomas G Black
*Assistant Examiner* — Tyler Paige
(74) *Attorney, Agent, or Firm* — Allen, Dyer, Doppelt, Milbrath & Gilchrist, P.A.

(57) ABSTRACT

A traffic monitoring and notification system for vehicles includes road devices to be spaced apart along a road, and a traffic management controller. A portion of the vehicles may carry an electronic device that transmits an electronic address associated therewith. Each road device detects vehicles traveling on the road, determines if each detected vehicle is carrying an electronic device, and if so, then detects the electronic address associated therewith. A vehicle detection signal is transmitted based on each detected vehicle, and an electronic address signal is transmitted based on each detected electronic address. The traffic management controller receives the vehicle detection signals and the electronic address signals, determines a traffic pattern of the vehicles on the road based on the vehicle detection signals, and transmits a respective travel notification signal to each electronic device transmitting the electronic address associated therewith to provide travel information to a driver.

23 Claims, 8 Drawing Sheets

(51) Int. Cl.

| | |
|---|---|
| ***G08G 1/052*** | (2006.01) |
| ***G08G 1/08*** | (2006.01) |
| ***G08G 1/0967*** | (2006.01) |

(56) References Cited

U.S. PATENT DOCUMENTS

| | | | | |
|---|---|---|---|---|
| 7,804,423 | B2 * | 9/2010 | Mudalige et al. | 340/902 |
| 8,280,617 | B2 * | 10/2012 | Young et al. | 701/119 |
| 8,510,025 | B2 * | 8/2013 | Chan et al. | 701/117 |
| 8,576,069 | B2 * | 11/2013 | Nadeem et al. | 340/539.25 |
| 8,718,907 | B2 * | 5/2014 | Young et al. | 701/117 |
| 2008/0074289 | A1 * | 3/2008 | Sauder et al. | 340/909 |
| 2009/0079555 | A1 * | 3/2009 | Aguirre De Carcer et al. | 340/441 |
| 2009/0210141 | A1 * | 8/2009 | Young et al. | 701/119 |
| 2009/0309757 | A1 * | 12/2009 | Mudalige et al. | 340/905 |
| 2011/0057783 | A1 * | 3/2011 | Yagi et al. | 340/436 |
| 2011/0095908 | A1 * | 4/2011 | Nadeem et al. | 340/905 |

* cited by examiner

TRAFFIC MONITORING AND NOTIFICATION SYSTEM AND ASSOCIATED METHODS

RELATED APPLICATIONS

This application claims the benefit of U.S. Provisional Application Ser. No. 61/623,871 filed Apr. 13, 2012, the entire contents of which are incorporated herein by reference.

FIELD OF THE INVENTION

The present invention relates to the field of vehicle traffic, and more particularly, to a system and associated methods for monitoring, evaluating and disseminating traffic related information.

BACKGROUND OF THE INVENTION

The flow of vehicle traffic has been studied extensively in the last few decades. Traffic control software including traffic based algorithms have been implemented to control the timing of traffic signal lights that regulate vehicle traffic.

A typical signalized intersection includes a traffic controller that is hard wired to the signal lights at the intersection for control thereof. The traffic controller includes algorithms for operating the signal lights. To more efficiently maintain the flow of traffic along a busy roadway with several signalized intersections, operation of the signal lights is coordinated among the traffic controllers associated therewith.

Efforts have been made to simplify the infrastructure used for monitoring and controlling signalized intersections. For example, U.S. Published Patent Application No. 2008/0074289 discloses a wireless traffic signal light management system. The system includes a master controller, wireless nodes dispersed in a geographic area and traffic signal lights also dispersed in the geographic area. The traffic signal lights are communicatively coupled to the master controller via the wireless nodes. Each wireless node is associated with a distinct Internet protocol address, and a wireless communication link provides Internet protocol based communications between the wireless nodes and the master controller. The wireless nodes receive control data packets for the communicatively coupled traffic signal lights from the master controller via the wireless communication link. The control data packets include the distinct Internet protocol address and operational instructions for at least one traffic signal light communicatively coupled to the wireless node, and each traffic signal light is responsive to the operational instructions in the control data packets.

Efforts have also been made to measure traffic flow by sampling a portion of actual travel times for vehicles in the traffic stream. Several cities in the United States, such as Houston and Boston, have been making measurements based on signals available from a point-to-point networking protocol commonly referred to as Bluetooth.

The majority of consumer electronic devices come equipped with Bluetooth wireless capability to communicate with other devices in close proximity. Bluetooth enabled devices can communicate with other Bluetooth enabled devices anywhere from 1 meter to about 100 meters, depending on the power rating of the Bluetooth devices. The Bluetooth protocol uses an electronic address, or tag, called a Media Access Control address, or MAC address.

A vehicle containing a detectable Bluetooth device is observed at successive detection stations. The MAC address and time of detection is logged, and the information is used to obtain an accurate sample of the travel time and an average speed. This type of information is generally used for measuring traffic flow.

There are other types of systems that provide traffic information to travelers via messages displayed on fixed road signs. The road signs are remotely programmable to provide messages about travel times and conditions on the roadway. A drawback of this approach is that the fixed road signs are expensive. Another drawback is that the travelers may already be on the road if the message being displayed is directed to an impending delay due to an accident.

Even in view of the advances made in traffic monitoring and traffic management, there is still a need to improve upon these activities.

SUMMARY OF THE INVENTION

In view of the foregoing background, an object of the present invention is to provide a straightforward and efficient approach for monitoring, evaluating and disseminating traffic related information.

This and other objects, features, and advantages in accordance with the present invention are provided by a traffic monitoring and notification system for vehicles, with a portion of the vehicles each carrying an electronic device comprising a transceiver configured to transmit an electronic address associated therewith, and notification circuitry coupled to the transceiver.

The traffic monitoring and notification system may comprise road devices to be spaced apart along a road. Each road device may detect vehicles traveling on the road, determine if each detected vehicle is carrying an electronic device, and if so, then detect the electronic address associated therewith. Each road device may be configured to transmit a vehicle detection signal based on each detected vehicle, and transmit an electronic address signal based on each detected electronic address.

The traffic monitoring and notification system may further comprise a traffic management controller to receive the vehicle detection signals and the electronic address signals from the road devices, determine a traffic pattern of the vehicles on the road based on the vehicle detection signals, and transmit a respective travel notification signal to the transceiver of each electronic device transmitting the electronic address associated therewith. The travel notification signal may be used to provide travel information to a driver via the notification circuitry coupled to the transceiver. Providing travel notification directly to an electronic device within a vehicle advantageously informs and influences the driver's decisions regarding travel plans and itineraries.

The traffic management controller may be further configured to determine a speed of each detected vehicle carrying an electronic device based on the received electronic address signals associated therewith. The electronic address signal may comprise a MAC address, for example.

The notification circuitry may comprise a display, with the travel notification being provided to the driver by at least one of a text message, an image message and a video message. Alternatively or in addition to, the notification circuitry may comprise a speaker, with the travel notification being provided to the driver as an audio message. The travel information may comprise at least one of travel times, traffic delays, lane closures, route detours, and evacuation routes.

The traffic monitoring and notification system may further comprise at least one relay hub to relay the vehicle detection signals and the electronic address signals from the road devices to the traffic management controller. Similarly, the traffic monitoring and notification system may further comprise at least one traffic notification dissemination device configured to relay the travel notification signals from the traffic management controller to each detected vehicle carrying an electronic device.

The road devices may be configured as a mesh network, with each road device comprising a transceiver configured to relay the vehicle detection signals and the electronic address signals from one adjacent road device to another adjacent road device. The transceiver in each electronic device may comprise a Bluetooth transceiver, and the transceiver in each road device may likewise comprise a Bluetooth transceiver, for example.

Each road device may comprise a vehicle proximity detector for detecting the vehicles traveling on the road, and a transceiver coupled to the vehicle proximity detector for transmitting the vehicle detection signals and the electronic address signals. Each road device may be configured to operate based on solar power.

The traffic monitoring and notification system may further comprise at least one traffic signal head associated with at least one traffic signal for control thereof, with the traffic signal head being placed at the road with the road devices. The traffic management controller may be further configured to operate the at least one traffic signal head based on the received vehicle detection signals and the electronic address signals.

The electronic addresses associated with the electronic devices may be pre-registered with the traffic management controller.

Another aspect of the present invention is directed to a method for operating a traffic monitoring and notification system for vehicles, as described above. The method may comprise placing road devices along a road, with each road device configured to detect vehicles traveling on the road, determine if each detected vehicle is carrying an electronic device, and if so, then detect the electronic address associated therewith. A vehicle detection signal may be transmitted based on each detected vehicle, and an electronic address signal may be transmitted based on each detected electronic address. The method may further comprise operating the traffic management controller to receive the vehicle detection signals and the electronic address signals from the road devices, determine a traffic pattern of the vehicles on the road based on the vehicle detection signals, and transmit a respective travel notification signal to the transceiver of each electronic device transmitting the electronic address associated therewith. The travel notification signal may be used to provide travel information to a driver via the notification circuitry coupled to the transceiver.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
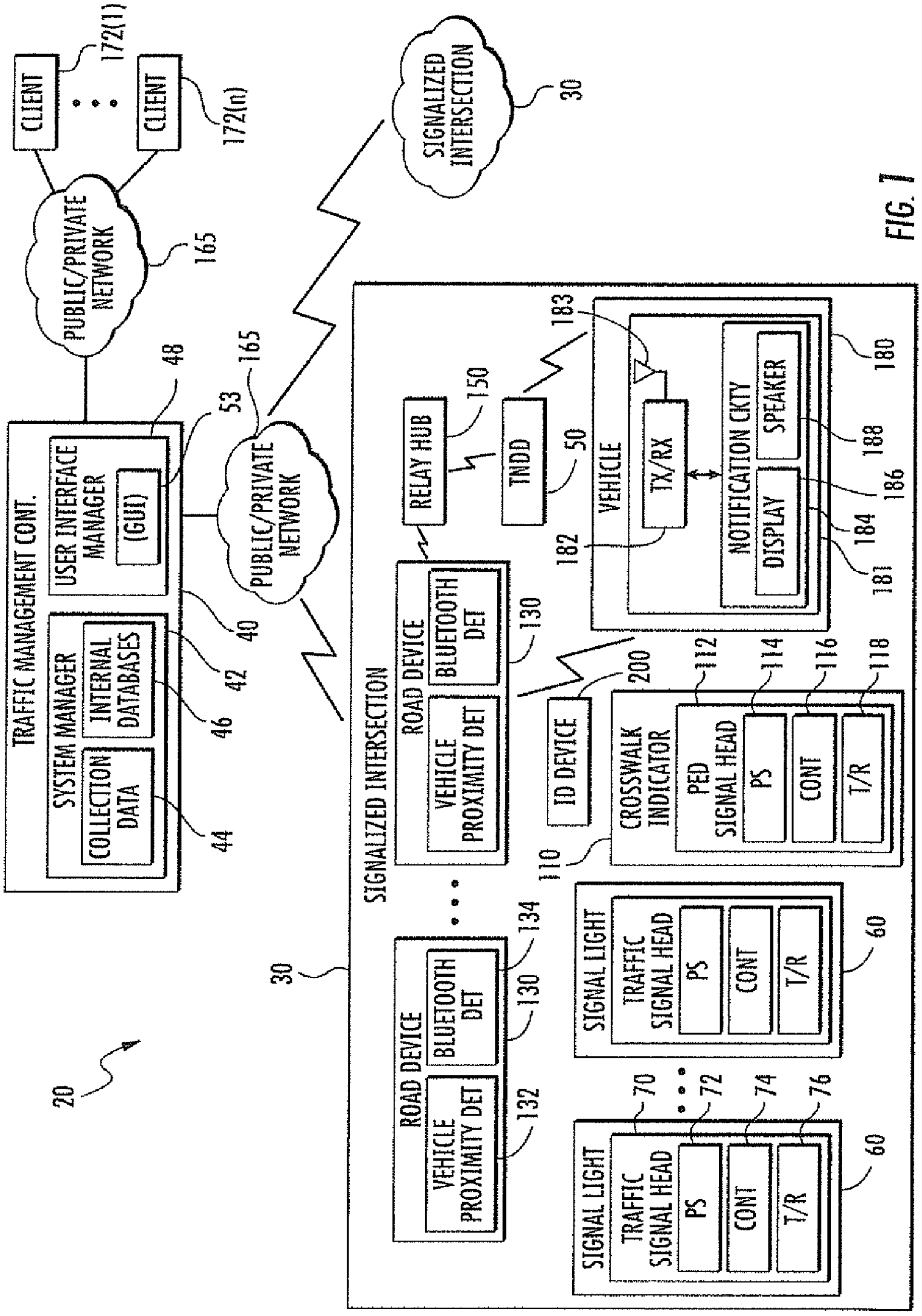
FIG. 1 is a schematic diagram of signalized intersections interfacing with a traffic management controller in accordance with the present invention.

As will be explained in greater detail below, a system is provided for the real-time monitoring and processing of traffic (pedestrian and vehicular) and parking data while simultaneously disseminating information to Bluetooth enabled device users. As illustrated in FIG. 1, both hardware and software components allow for a turn-key traffic monitoring and notification system 20 that provides system operators with the ability to efficiently monitor a traffic facility and increase the distribution of key information useful for travel decisions. As will be discussed in greater detail below, travel decisions may also be directed to include parking related decisions.

The dissemination of traffic related information is advantageously assisted based on the ability to leverage an existing infrastructure of cellular phones and other electronic devices equipped with Bluetooth. Moreover, this ability to disseminate information expands as emerging Bluetooth technologies are integrated into vehicle hands-free and navigation systems. Even though Bluetooth is the current industry standard, the disclosed traffic monitoring and notification system 20 is not limited to Bluetooth. Other short range communications protocols may be used, as readily appreciated by those skilled in the art.

The traffic monitoring aspect of the traffic monitoring and notification system 20 is to detect, collect, store, process and manage traffic data for various uses. An example is the processing of raw traffic data for identifying the current status of a roadway or parking facility, and then disseminating this information to assist the public with travel decisions. The efficiency of a transportation facility may advantageously be increased via the use of an intelligent infrastructure using Bluetooth technology. As will be explained in greater detail below, Bluetooth enabled devices within the vehicles may be used to receive a respective travel notification signal, with the travel notification signal being used to provide travel information to a driver.

The system may be structured as a three-tier system that includes field, management, and data processing components. The field components include road devices 130 for detecting vehicles 180, traffic notification dissemination devices 50, traffic signal heads 70, pedestrian signal heads 112, object identifiers (ID) 200 and relay hubs 150. The management component includes a traffic management controller 40 that provides vital system operational information, analyzes system performance, manages system data, and communicates system needs to the clients. The data processing component provides a graphical user interface (GUI) 53 and various forms of data manipulation and presentation to the clients. Clients may include city engineers and parking lot operators, for example.

Collectively, the three-tier system provides for the ability to monitor, evaluate and disseminate traffic related information to system end users. In addition, travel information is advantageously disseminated to assist the public with travel decisions. Travel information may be disseminated or distributed using existing and evolving infrastructures of Bluetooth technology, for example. The travel information may be delivered directly to vehicles 180 with Bluetooth enabled devices 181. Each Bluetooth enabled device 181 includes a transceiver 182, an antenna 183 coupled thereto, and notification circuitry 184 coupled to the transceiver. The travel information may be in various forms, such as text, images, video and audio, and is provided to the driver via the notification circuitry 184. The notification circuitry 184 may include a display 186 and/or a speaker 188.

As previously mentioned, even though the dissemination of travel information is discussed herein in terms of Bluetooth technology, the system 20 is not limited to Bluetooth. Other communication protocols may be used in addition to or in place of Bluetooth technology, as readily appreciated by those skilled in the art.

Still referring to FIG. 1, a first aspect of the traffic monitoring and notification system 20 is directed to a plurality of signalized intersections 30 interfacing with a traffic management controller 40. The traffic management controller 40 collects traffic related information from the signalized intersections 30 in real-time via relay hubs 150. This allows for real-time monitoring and processing of vehicular and pedestrian traffic. For a single intersection, a relay hub 150 may not be required since the road devices 130 may be close enough to communicate to the traffic management controller 40. For multiple signalized intersections 30, relay hubs 150 may be required.

In addition, the traffic management controller 40 is further configured to simultaneously disseminate information in response to the collected traffic related information to Bluetooth enabled device users via the data the traffic notification dissemination devices (TNDDs) 50. The traffic notification dissemination devices 50 may also be referred to as data acquisition and dissemination devices (DADDs). Each signalized intersection 30 may typically include at least one relay hub 50 and one traffic notification dissemination device 50.

Each signalized intersection 30 includes one or more traffic lights 60. Associated with each traffic light 60 is a traffic signal head 70 configured to operate the traffic light. Each traffic signal head 70 includes a rechargeable power supply 72, a controller 74 and a wireless transceiver 76 that provides a wireless interface for configuration and monitoring. The wireless transceiver 76 operates at the Bluetooth frequency of 2400-2480 MHz.

When a signalized intersection 30 includes two or more traffic lights 60, one of the traffic signal heads 70 further operates as an intersection controller. An intersection controller coordinates operations of all the traffic lights 60 at the signalized intersection 30.

In addition, one or more crosswalk indicators 110 to assist pedestrians crossing the roadway may be located at each signalized intersection 30. Each crosswalk indicator 110 includes a pedestrian signal head 112 that includes a rechargeable power supply 114, a controller 116 and a wireless transceiver 118. The wireless transceiver 118 operates at the Bluetooth frequency of 2400-2480 MHz, and allows for reception of an activation signal from a call button indicating that a pedestrian wants to cross the road, and for communicating this request to the wireless transceivers 76 in the traffic signal heads 70.

An advantage of the traffic signal heads 70 and the pedestrian signal head 112 being wireless with rechargeable power supplies is that this avoids the need for conduits and wires to directly connect with a power source and to an intersection controller, which are normal infrastructures associated with current hard-wired signalized intersections. Moreover, since one of the traffic signal heads 70 in the illustrated embodiment can be configured to operate as an intersection controller, the intersection controller currently associated with the current hard-wired signalized intersections can be eliminated. As with the traffic signal heads 70, the pedestrian signal head 110 also offers the same advantages.

Placed on the ground in the lanes leading into and away from each signalized intersection 30 is a plurality of road devices 130, which may also be referred to as advanced road markers (ARMs). A road device 130 enables the monitoring of an intersection lane by actively monitoring for the presence of a metallic object, such as a vehicle 180, at any given time. A vehicle proximity detector 132 within the road device 130 detects the presence of a vehicle 180, and this information is provided to the relay hub 150 as a vehicle detection signal, wherein the relay hub relays the vehicle detection signal to the traffic management controller 40.

The road devices 130 within the signalized intersections 30 may collectively function as a mesh network, as readily appreciated by those skilled in the art. As noted above, at least one of the road devices 130 within the signalized intersection 30 interfaces with the relay hub 150 associated with that particular signalized intersection 30. The relay hub 150 then communicates with the traffic management controller 40 via a public and/or private network 165. A mesh network is reliable and offers redundancy. When one road device 130 can no longer operate, the remaining road devices can still communicate with each other to provide the necessary signals to the relay hub 150.

Each road device 130 also includes a Bluetooth detector 134 configured to operate as a sniffer for detecting the presence of vehicles 180 containing Bluetooth devices. The MAC address and time of detection, i.e., a time stamp, are transmitted to the traffic management controller 40 as an electronic address signal via the relay hub 150. When the same MAC addresses are detected and reported by different road devices 130, the traffic management controller 40 is able to obtain an accurate sample of the travel time and an average speed of the traffic.

The traffic notification dissemination devices (TNDDs) 50 associated with each signalized intersection 30 interfaces with the traffic management controller 40 via the relay hub 150 that is associated with the same signalized intersection. Alternatively, the traffic notification dissemination devices 50 may bypass the relay hub 150 when interfacing with the traffic management controller 40. Information determined by the traffic management controller 40 based on the sampled travel times and average speed of the traffic may advantageously be disseminated to assist the public with travel decisions. Information may be disseminated or distributed using existing and evolving infrastructures of Bluetooth technology.

Each traffic notification dissemination device 50 regularly scans for Bluetooth enabled devices with a range of about 100 meters (300 feet) in open fields, for example, or about 50 meters (160 feet) in closed areas, for example, depending on the topology and the targeted type of wireless devices. For every wireless device detected, the traffic notification dissemination devices 50 sends a message to that device asking it if it would like to "pair" for file sharing. Once a Bluetooth enabled device user accepts the request, the traffic notification dissemination devices 50 disseminate programmed data. The programmed data is disseminated in the form of pre-determined or real-time text, video, audio or picture files in a format acceptable to be received and viewed by a Bluetooth enabled device 181.

For each signalized intersection 30, the illustrated relay hub 150 thus interfaces between the relay devices 130 and the traffic management controller 40, as well as between the traffic management controller and the traffic notification dissemination device 50. In addition, the relay hubs 150 also interface between the traffic management controller 40 and the traffic and pedestrian signal heads 70, 112. The relay hubs 150 advantageously operate as a bridge for the system 20.

In the transition from current hard-wired signalized intersection to wireless signalized intersections 30 as discussed above, there may be three general functions of the relay hub 150. One general function is as a data hub as discussed above to collect and forward data to the traffic management controller 40.

A second general function is at current hard-wired signalized intersections, where a relay hub 150 will also collect and forward data to the traffic management controller 40, and also forward certain data to the intersection controller associated with the hard-wired signalized intersection. This data may include vehicle proximity data as provided by the reporting ARMs 130. The data from the ARMs 130 are managed by the relay hub 150 in two ways. One way to manage is to forward the data to the traffic management controller 40 for general use. Another way is to forward the data to the existing hard-wired intersection controller for intersection use/operation.

A third general function of the relay hub 150, as discussed above, is to completely replace the hard-wired intersection controller at signalized intersections. This requires the traffic signal heads 70 and the pedestrian signal heads 110. The traffic signal heads 70 house hardware and software that can be programmed without the need for the current hard-wired intersection controller. Under this configuration, the relay hub 150 perform all the actions as discussed above, plus additional high-level software programming to assist with operation of the traffic signal heads 70.

The traffic management controller 40 may be referred to as the central command. For illustration purposes, the traffic management controller 40 is divided into two sections. Once section includes a server 42 that functions as a system manager. The system manager 42 collects the data 44 reported by the signalized intersections 30 as well as of the overall system 20, and stores the collected data in internal databases 46. The system manager 42 is used to manage and monitor the overall system 30.

The other section includes a server that functions as a user interface 48. A public and/or private network 165 interfaces with the user interface 48. The user interface 48 may also be referred to as the web interface when access to the collected data is via the Internet 165. The user interface 48 allows a client 172(1)-**172(*n*) and/or user to determine and disseminate various reporting metrics (such as travel time and parking occupancy) throughout the system 20. The user interface 48 polls all necessary data from the system manager 42, and applies programmed algorithms to produce varying reporting metrics. The user interface 48 also hosts a graphical user interface (GUI) 53** primarily structured as a regional map depicting the system layout with various links to data metrics.

The system 20 may also include temporary or permanent identifier (ID) devices 200, which are configured as Bluetooth transmission devices. The ID devices 200 may range from personal carrying devices to permanently installed vehicular mounted devices. Each ID device 200 transmits data at the Bluetooth frequency of 2400-2480 MHz containing unique identification (e.g., unique MAC address) and geospatial data that are received by the system 20, such as by the road devices 130, for example. The unique identification and geospatial data are processed in real-time by the traffic control manager 40.

Data manipulation of a known MAC address transmitted by the ID devices 200 within the system 20 allows for varying functions such as, but not limited to, location, tracking, and monitoring. For example, a cell phone number and corresponding MAC address may be logged into or pre-registered with the traffic management center 40. Since the ID devices 200 also transmit geospatial data, the system is able to track an item or person by using the Bluetooth detection devices within the road devices 130 and traffic notification dissemination devices 50 place the position of the item or person on a map. In addition, the cell phone number associated with the MAC address may be used to notify that person.

Figure 2:
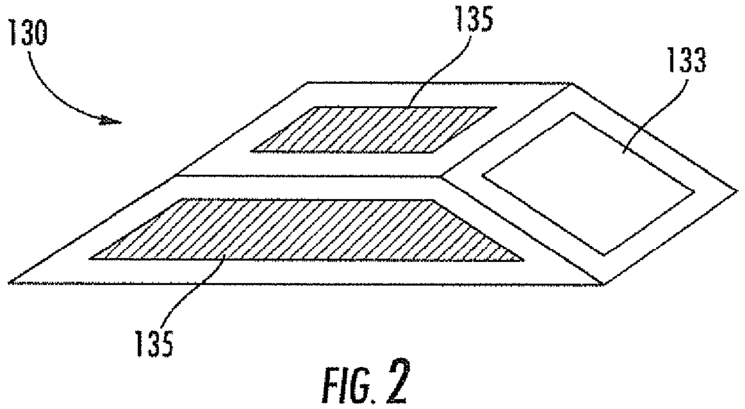
FIG. 2 is a perspective view of a road device in accordance with the present invention.
Figure 3:
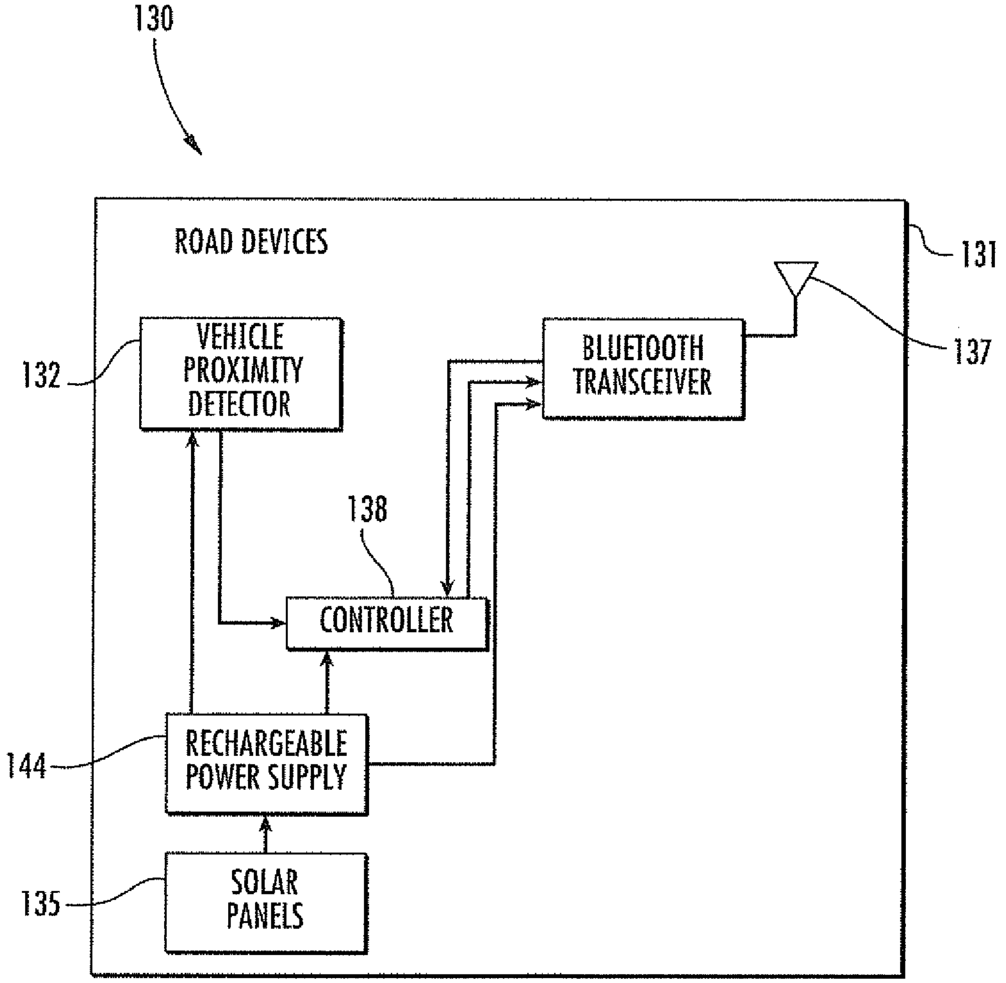
FIG. 3 is a block diagram of the road device illustrated in FIG. 2.

Certain components making up the system 20 will now be discussed in greater detail. The road devices 130 are hardened field devices with a rugged exterior that are attached directly to the roadway. Each road device 130 has angled sides, as illustrated in FIG. 2. A color indicating reflector 133 may be on a front side of the road device 130, and solar panels 135 may be on a top surface and on opposing sides.

Each road device 130 includes a housing 131. Within the housing 131 is a vehicle proximity detector 132. The vehicle proximity detector 132 may be a magnetometer, for example, which indicates metallic objects in close proximity to the road device 130. The range may be 1 to 4 feet, for example. The magnetometer uses the magnetic influx from the earth and it knows north, south, east and west. As an alternative to a magnetometer, a Hall effect sensor may be used. A single road device 130 may be used to determine speed of a detected vehicle 180 when multiple vehicle proximity detectors 132 are included therein, as readily appreciated by those skilled in the art.

Also within the housing 131 is a Bluetooth transmitter 134 with an antenna 137 coupled thereto. The Bluetooth transmitter 134 functions as a Bluetooth detector to operate as a sniffer for detecting the presence of vehicles 180 containing Bluetooth devices. The MAC address and time of detection, i.e., a time stamp, are provided to the controller 138 via an electronic address signal.

The road device 130 is a dual detection system where both the proximity detector 132 and the Bluetooth transmitter 134 provide detection data to the controller 138. The controller 138 is an on-board CPU for reporting back to the relay hub 150 via the Bluetooth transmitter 134.

The power supply 144 for the road device 130 maintains an operational power level for electronics carried by the housing 131. The power supply 144 is a battery, for example, that is rechargeable by the solar panels 135 carried by exterior surfaces of the housing 131.

Figure 4:
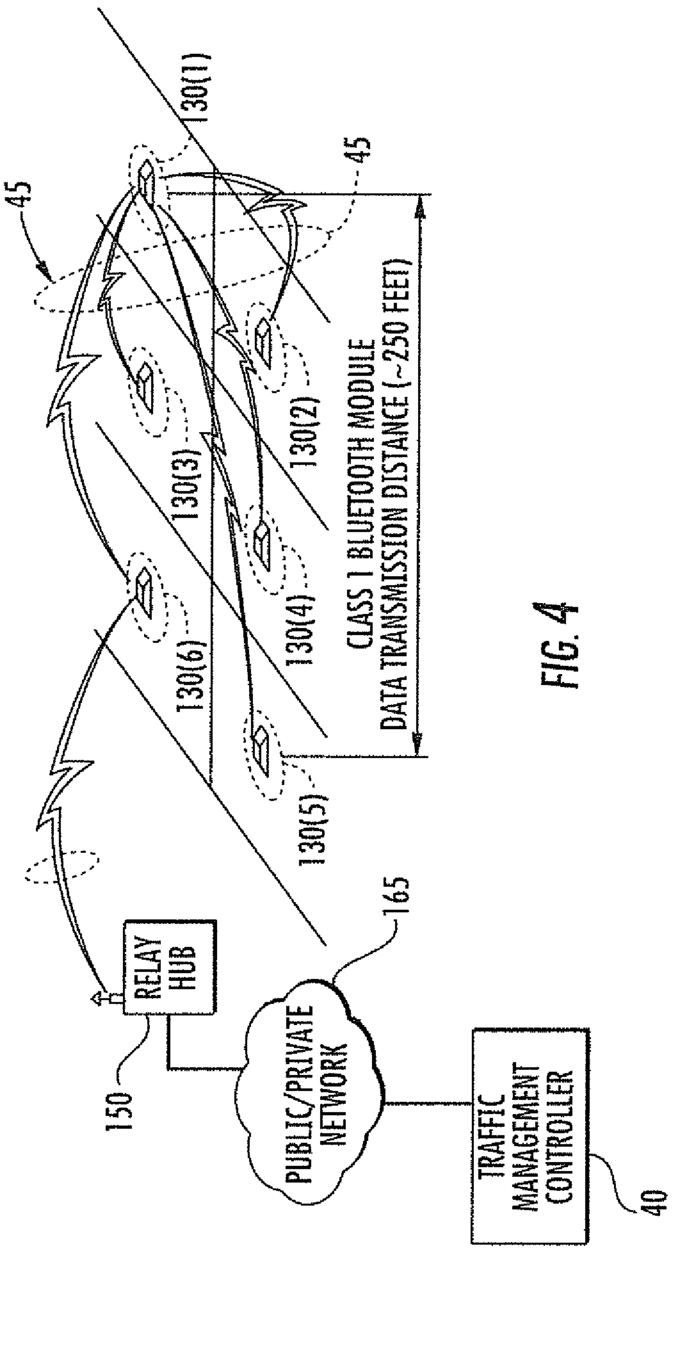
FIG. 4 is a schematic diagram of the road devices operating as a mesh network with a relay hub in accordance with the present invention.

As noted above, the road devices 130 operate as a mesh network to transfer data to and from the traffic management controller 40. As illustrated in FIG. 4, data is transferred from any one road device 130(1) to all the road device 130(2)-130(6) that are within broadcast range, as indicated by the dashed circle 45. One of the road devices 130(6) is designated as the master road device for transmitting the collected field data to the relay hub 150. The relay hub 150 functions as a wireless bridge to a public and/or private network 165. With respect to the mesh network, all of the road devices 130(1)-130(6) may operate as either a slave or a master. The system 20 is configured for logical redundancy to safeguard against data loss. A “fail to next master” design may be used to optimize data mesh and ensure data reporting.

Figure 5:
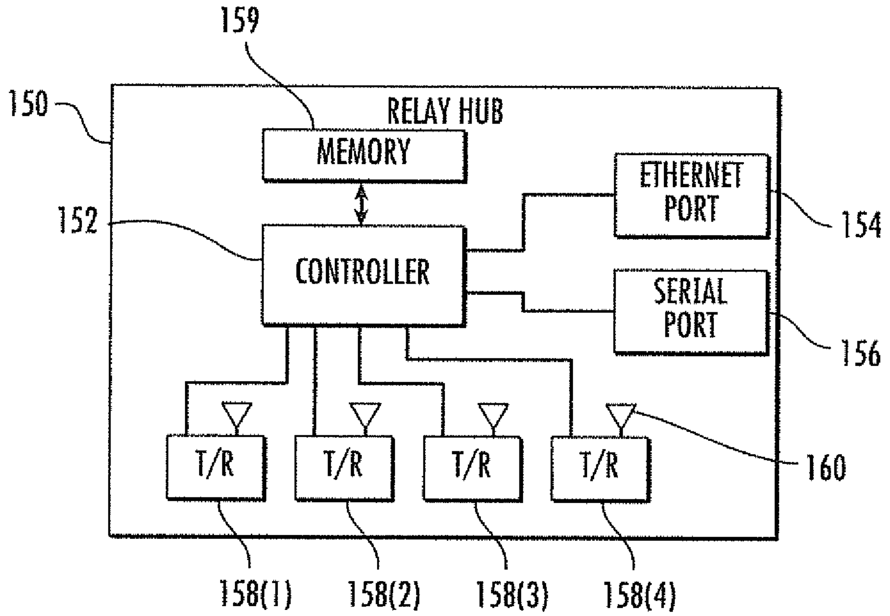
FIG. 5 is a block diagram of the relay hub in accordance with the present invention.

The relay hubs 150 interface with the road devices 130 and the traffic management controller 40. Each relay hub 150 includes a controller 152, as illustrated in FIG. 5. The controller 152 is connected to an Ethernet port 154 and a serial port 156. These ports 154, 156 provide communications interfaces to connect locally (for local management) and remotely with a network 165 that connects to the traffic management controller 40. The relay hub 150 includes a plurality of Bluetooth transceivers 158(1)-158(4) for interfacing with the road devices 130. Each Bluetooth transceiver 158(1)-158(4) has an antenna 160 coupled thereto. If the road devices 130 optionally include a transceiver that operates at a frequency other than the Bluetooth frequency range, then the relay hub 150 would also include the optional receiver so that a communications interface is provided therebetween.

The controller 152 is configured to enable self-monitoring, data collection, configuration, and data exchange. The controller 152 collects and stores data in a memory 159, such as a permanent flash memory, as well as rotating table data collected from sampled field devices. The memory 159 retains data through extended power outages.

The relay hub 150 provides three main categories of data: identification data, diagnostic data and collected data. Identification data includes standard unit information such as device ID, device name, network address (gateway, subnet mask, IP address), geographic positioning data, and date and time, for example. The diagnostic data includes metrics programmed within the device, such as packet transfer/data error rate, broadcasted file and power level. The collected data includes device MAC addresses and date/time stamps. The memory 159 stores the collected data in an organized manner to be communicated to the traffic management controller 40 for data management.

Figure 6:
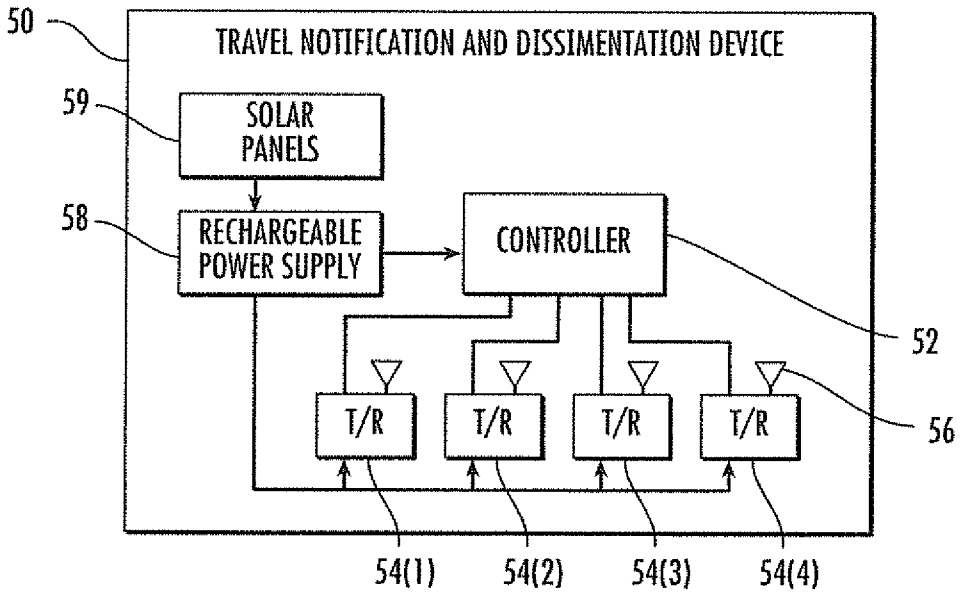
FIG. 6 is a block diagram of a traffic notification dissemination device in accordance with the present invention.

Referring now to FIG. 6, each traffic notification dissemination device (TNDD) 50 includes a controller 52, and a plurality of Bluetooth transceivers 54(1)-54(4) coupled to the controller. Each Bluetooth transceiver 54(1)-54(4) has an antenna 56 coupled thereto. The traffic notification dissemination device 50 regularly scans for Bluetooth enabled devices 181 with a range of about 100 meters (300 feet) in open fields, for example, or about 50 meters (160 feet) in closed areas depending on the topology and the targeted type of wireless device. For every device detected, the controller 52 sends a message to that device 181 asking it if it would like to “pair” for file sharing. Once a Bluetooth enabled device 181 accepts the request, the controller 52 disseminates programmed data. As noted above, programmed data may be pre-determined text, video, audio, or picture files in a format acceptable to be received and viewed by a Bluetooth enabled device 181, such as via a display 186 or a speaker 188. The controller 52 confirms that it has initiated communications and completed the download with paired Bluetooth devices 181 entering its area of influence.

The power supply 58 for the traffic notification dissemination device 50 maintains an operational power level for electronics carried therein. The power supply 58 is a battery, for example, that is rechargeable by solar panels 59.

Figure 7:
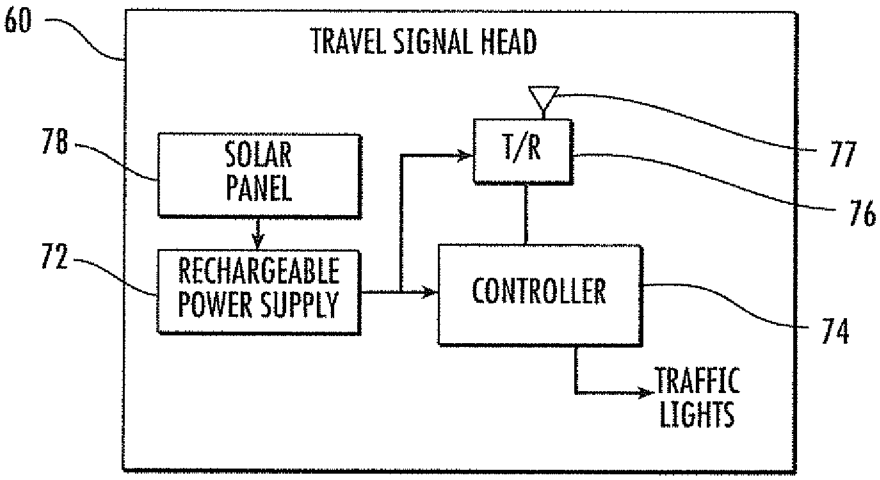
FIG. 7 is a block diagram of a traffic signal head in accordance with the present invention.

Referring now to FIG. 7, the traffic signal head 60 includes a rechargeable power supply 72, a controller 74 and a wireless transceiver 76. As noted above, the wireless transceiver 76 operates at the Bluetooth frequency of 2400-2480 MHz. An antenna 77 is coupled to the transceiver 76. The power supply 72 is a battery, for example, that is rechargeable by solar panels 78. Although not illustrated in the same level of detail, the optional signal controller 90 and the pedestrian signal head 112 are similarly formed.

Figure 8:
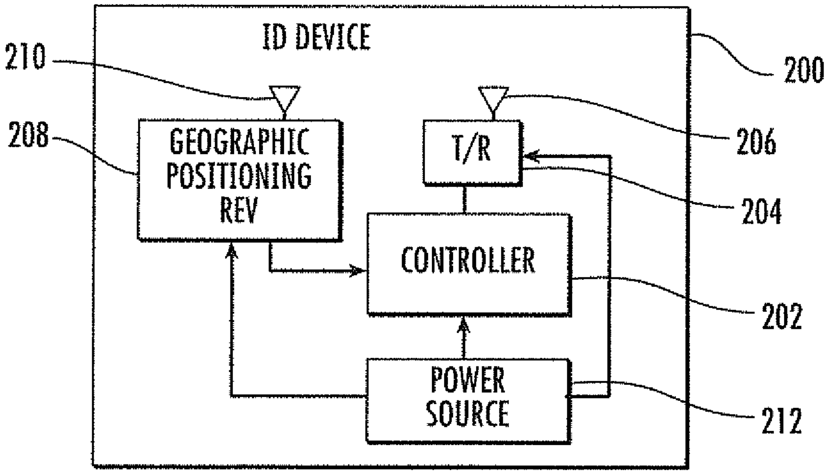
FIG. 8 is a block diagram of an identifier (ID) device in accordance with the present invention.

A block diagram of an identifier (ID) device 200 is provided in FIG. 8. As discussed above, the ID device 200 may range from personal carrying devices to permanently installed vehicular mounted devices. Each ID device 200 includes a controller 202, and a transceiver 204 transmitting data at the Bluetooth frequency of 2400-2480 MHz. An antenna 206 is coupled to the transceiver 204. The transmitted data includes identification in the form of a unique MAC address, and geospatial data. The geospatial data is provided by a geographic positioning receiver 208 coupled to the controller 202. An antenna 210 is coupled to the geographic positioning receiver 208, which may be a GPS receiver, for example.

The illustrated power source 212 may be a battery, for example, particularly if the device is being carried by a person. If the ID device 200 is to be mounted to a vehicle, then the power source may be rechargeable via solar panels as discussed above for the other devices or tied directly to the vehicles power system, for example.

The traffic management controller 40 is divided into two sections: a system manager 42 and a user interface manager 48. The system manager 42 collects the data 44 reported by the signalized intersections 30 as well as of the overall system 20, and stores the collected data in internal databases 46.

The system manager 42 includes software that operates as the management suite for the overall system 20. The system manager 42 maintains constant communications with the relay hubs 150 and the user interface manager 48. The primary functions of the system manager 42 software includes constant monitoring of the overall system, collection and distribution of database metrics, diagnostic evaluation, and general evaluation of data against programmed thresholds which enables the client to make decisions for the system 20. This is accomplished primarily through the management and processing of a master database 46 housed within the server environment.

Communications with the relay hubs 150 is based on sending data that includes device configurations, updates, time clock, files for broadcast (audio, video, picture, and text) and queries (which will initiate receiving of data from the relay units 150), for example. Received data includes database logs, file(s) currently being broadcast, collected data, and status metrics (regarding diagnostics), for example.

Communications with the user interface manager 48 is based on sending data that includes relay hub identification data (specific to queried devices), relay hub diagnostic data (specific to queried devices), and system-wide collected data, and time clock data. Received data includes queries and processed information, and dissemination files, for example.

With the system manager 42, the client is able to manage the data and utilize the basic performance functions inherent in the software to provide upkeep of system components as well as collect system data to be used for their agency’s maintenance needs.

The user interface 48 may also be referred to as the web interface since access to the collected data is via the Internet via the public and/or private network 165. Alternatively, the user interface 48 may be through a direct connection as well as via an Ethernet/network connection. The user interface 48 allows a client 172(1)-**172(*n*) and/or user to determine and disseminate various reporting metrics (such as travel time and parking occupancy) throughout the system 20. The user interface 48 polls all necessary data from the system manager 42, and applies programmed algorithms to produce varying reporting metrics. The user interface 48 also hosts a graphical user interface (GUI) 53** primarily structured as a regional map depicting the system layout with various links to data metrics.

Within the software GUI, three primary elements will be programmed in addition to other functions: nodes, points, and links. Nodes equate to relay hubs 150 and traffic notification dissemination devices 50 deployed in the field. Points equate to road devices 130 deployed in the field. Links equate to defined lengths of roadway known to exist between any two nodes.

The general overview of the GUI is a regional map with a user having the ability to zoom in and out, or otherwise adjust the view of the mapping system. Color-coded nodes, points, and links will be depicted on the map.

Color-coded links will adjust in color depending on real-time calculated travel time conditions. Color will change depending on thresholds relating expected conditions of travel time to conditions observed by the system 20. A user can hover over link graphics to obtain real time data associated with that element. Should a user hover over a link graphic, a pop-up information dialog box would appear with basic information. The information provided in this pop-up includes real-time calculated travel time, and hyperlinks to statistical data (pre-programmed algorithms to provide various reporting metrics).

Color-coded nodes will adjust in color depending on real-time reporting conditions of the node. Color will change depending on thresholds relating operational conditions based on diagnostic metrics. A user can hover over node graphics to obtain real time data associated with that element. Should a user hover over a node icon, a pop-up information dialog box would appear with the basic information populated within. The information provided in this pop-up will include identification data and hyperlinks to management and configuration (which links user to the system manager 42 software and hardware suite for management of that device, and statistical data (pre-programmed algorithms to provide various reporting metrics).

In summary, the user interface 48 provides data processing and presentation for clients and end users. It is very helpful for clients and user to have graphical interpretation of system data and/or the ability to disseminate higher functional data processing information, such as travel time.

Figure 9:
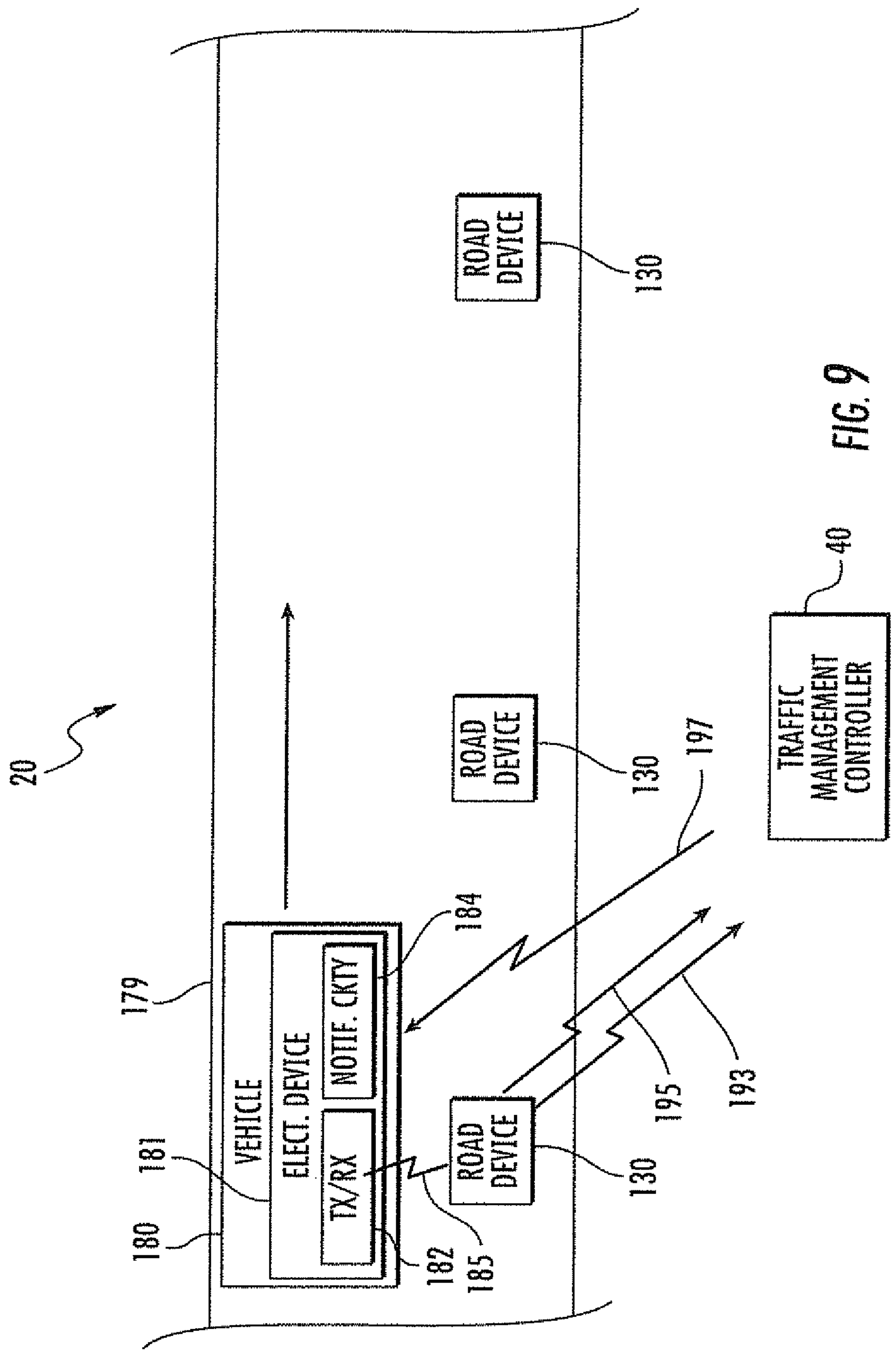
FIG. 9 is a block diagram of a traffic monitoring and notification system for vehicles in accordance with the present invention.

Referring now to FIG. 9, a simplified traffic monitoring and notification system 20 for vehicles 180, with a portion of the vehicles each carrying an electronic device 181 comprising a transceiver 182 configured to transmit an electronic address 185 associated therewith, and notification circuitry 184 coupled to the transceiver, will now be discussed.

The traffic monitoring and notification system 20 includes a plurality of road devices 130 spaced apart along a road 179. Each road device 130 is configured to detect vehicles 180 traveling on the road, determine if each detected vehicle is carrying an electronic device 181, and if so, then detect the electronic address 185 associated therewith. As discussed above, the electronic address 185 may correspond to a MAC address, for example. The road device 130 then transmits a vehicle detection signal 193 based on each detected vehicle 180, and also transmits an electronic address signal 195 based on each detected electronic address 185.

The traffic management controller 40 is configured to receive the vehicle detection signals 193 and the electronic address signals 195 from the road devices 130, and determine a traffic pattern of the vehicles 180 on the road 179 based on the vehicle detection signals. The traffic management controller 40 transmits a respective travel notification signal 197 to the transceiver 182 of each electronic device 181 transmitting the electronic address 185 associated therewith, with the travel notification signal being used to provide travel information to a driver via the notification circuitry 184 coupled to the transceiver 182. Providing travel notification directly to an electronic device 181 within a vehicle 180 advantageously informs and influences the driver's decisions regarding travel plans and itineraries.

Although not illustrated, the traffic management controller 40 may include a transceiver to interface with the road devices 130 and the electronic devices 181 within the vehicles 180. The traffic management controller 40 is further configured to determine a speed of each detected vehicle carrying an electronic device based on the received electronic address signals 195 associated therewith. Multiple road devices 130 are thus able to keep track of a particular vehicle based on its electronic address 185.

The notification circuitry 184 may include a display 186, with the travel notification being provided to the driver by at least one of a text message, an image message and a video message. Also, the notification circuitry 184 may include a speaker 188, with the travel notification being provided to the driver as an audio message. The travel information may include at least one of travel times, traffic delays, lane closures, route detours, and evacuation routes, for example, or any other associated transportation messages regarding travel, or any information that can affect a decision about transportation routes and itineraries.

Figure 10:
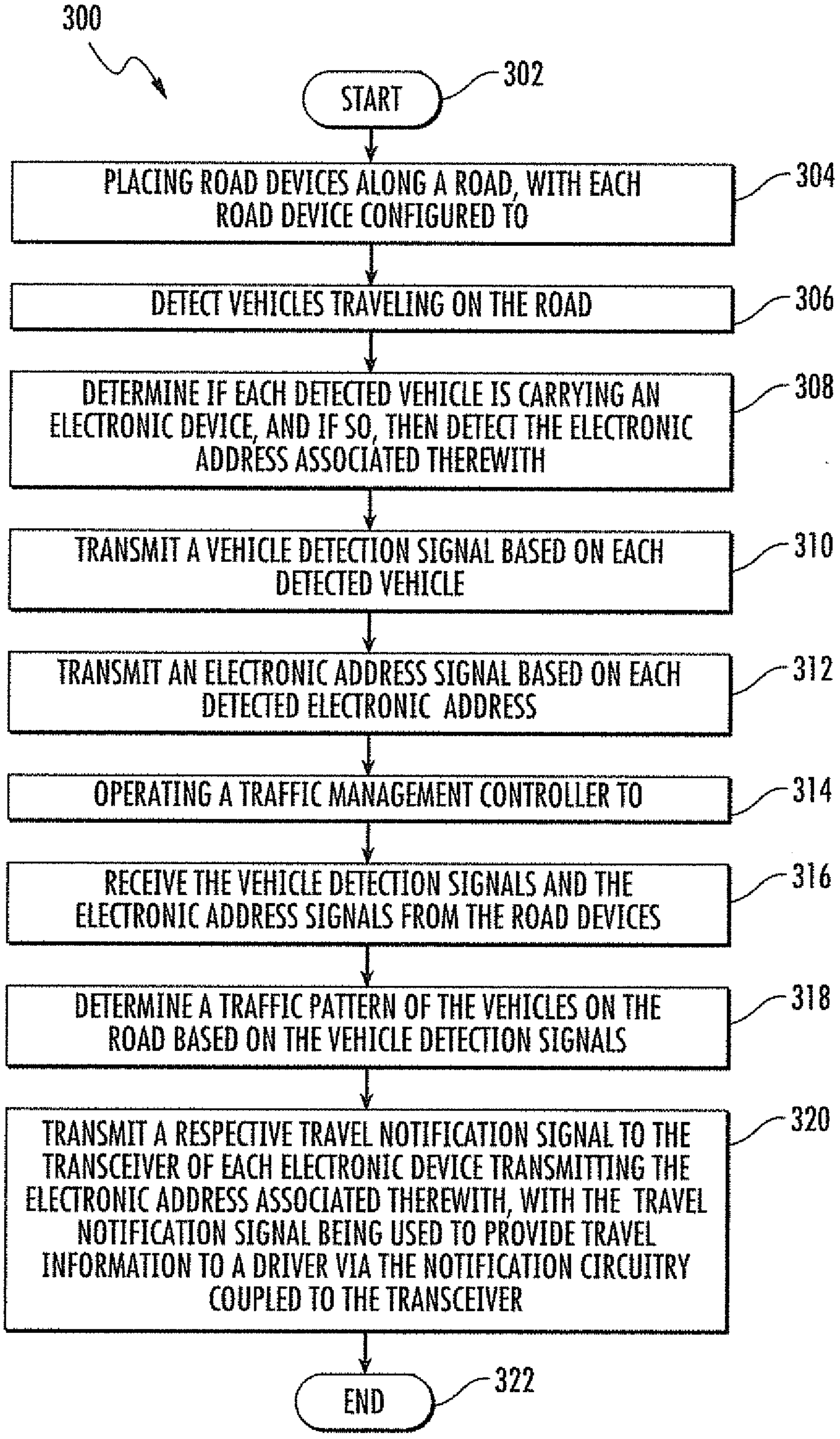
FIG. 10 is a flowchart illustrating a method for operating the traffic monitoring and notification system illustrated in FIG. 9.

Referring now to the flowchart 300 illustrated in FIG. 10, a method for operating the traffic monitoring and notification system 20 as discussed above includes, from the start Block 302), placing road devices 130 along a road 179 at Block 304. Each road device 130 is configured to detect vehicles 180 traveling on the road 179 at Block 306, determine at Block 308 if each detected vehicle is carrying an electronic device 181, and if so, then detect the electronic address 185 associated therewith. A vehicle detection signal 193 is transmitted at Block 310 based on each detected vehicle 180, and an electronic address signal 195 is transmitted at Block 312 based on each detected electronic address 185.

The method further includes operating a traffic management controller 40 at Block 314 to receive the vehicle detection signals 193 and the electronic address signals 195 from the road devices 130 at Block 316, and determine a traffic pattern of the vehicles on the road based on the vehicle detection signals 193 at Block 318. The method further includes transmitting at Block 320 a respective travel notification signal 197 to the transceiver 182 of each electronic device 181 transmitting the electronic address 185 associated therewith. The travel notification signal 197 is used to provide travel information to a driver via the notification circuitry 184 coupled to the transceiver 182. The method ends at Block 322.

Another aspect of the above described system 20 is directed to airports. A useful service to the flying public is the ability to have real-time flight status reports anywhere within the airport's facilities. To accomplish this, relay hubs 150 and/or traffic notification dissemination devices 50, together with hybrid versions of the relay hubs and traffic notification dissemination devices (adapted for internal use with standard electrical power sources) will be positioned so that end-users can communicate with the system as they enter the parking facilities managed by the system. Whether pairing with the system after parking or when arriving at the terminal, the pairing to interface with the airport's real-time flight schedule array equips end-users with real-time data. This capability detaches the airport guests from the anxiety of watching the walls of monitors that display flight schedules by transferring that data to their mobile device.

Additionally, the client may wish to utilize revenue generating capabilities like advertising. Whether advertising the airport's services, or selling messaging space to individual airlines or other related services, the practicality of this system for assisting the guest while generating revenue is self-evident.

Another aspect of the above described system 20 is directed to theme parks. Within a closed system, such as theme parks, a wristband (ID device) can be attached in a quick, secure, and tamperproof manner so as to provide positive real-time positioning of family members, children, or others that may have risk assessments, such as health issues, indicating this level of monitoring as appropriate. The wristband would necessitate a security deposit that would be refunded when the wristband is returned, and the quick release security mechanism is activated by the venue staff.

Guest Management is the terminology applied to the capability of the system to add value for both the Guest and Host in an interactive environment. Where the guest arrives at the host's venue, whether that venue is a Theme Park, a Shopping Mall, an Airport, a Cruise Ship, a Football Game, or any situation where the guest and host relationship can benefit from inexpensive and interactive information exchanges, the system offers unparalleled real-time exchanges of information. For temporary or itinerant events, such as Art Shows, Parades, or even emergency situations like extreme weather events, the illustrated system 20 may be scaled down so as to be deployed as a mobile operations system that can be rented, leased, or purchased based on the client's needs. The Guest Management process is customizable to the client's needs and can include the intelligent parking system, such that as the guest parks or arrives the system's relay hubs 150/traffic notification dissemination devices 50 are broadcasting information relative to the guest's location within the overall venue site, and other general information that might enhance the guest's visit. General information might include special events, V.I.P. appearances, coupons and special offers, and other information the host feels is a benefit for the guest's visit within their venue.

The host, through the system manager 42 and the user interface 48, is able to model movement characteristics of the traffic entering and leaving the venue site, and the movement characteristics of Smartphone users and ID devices, to make real-time predictive decisions that manage pedestrian and vehicular traffic efficiently. Additionally, the data generated through the guest management system can be archived and studied for future design modifications and new design criteria. The host has the option to use the information dissemination and broadcasting capabilities of the system to advertise its own goods and services, and the host can sell advertising to other vendors as it deems appropriate.

Figure 11:
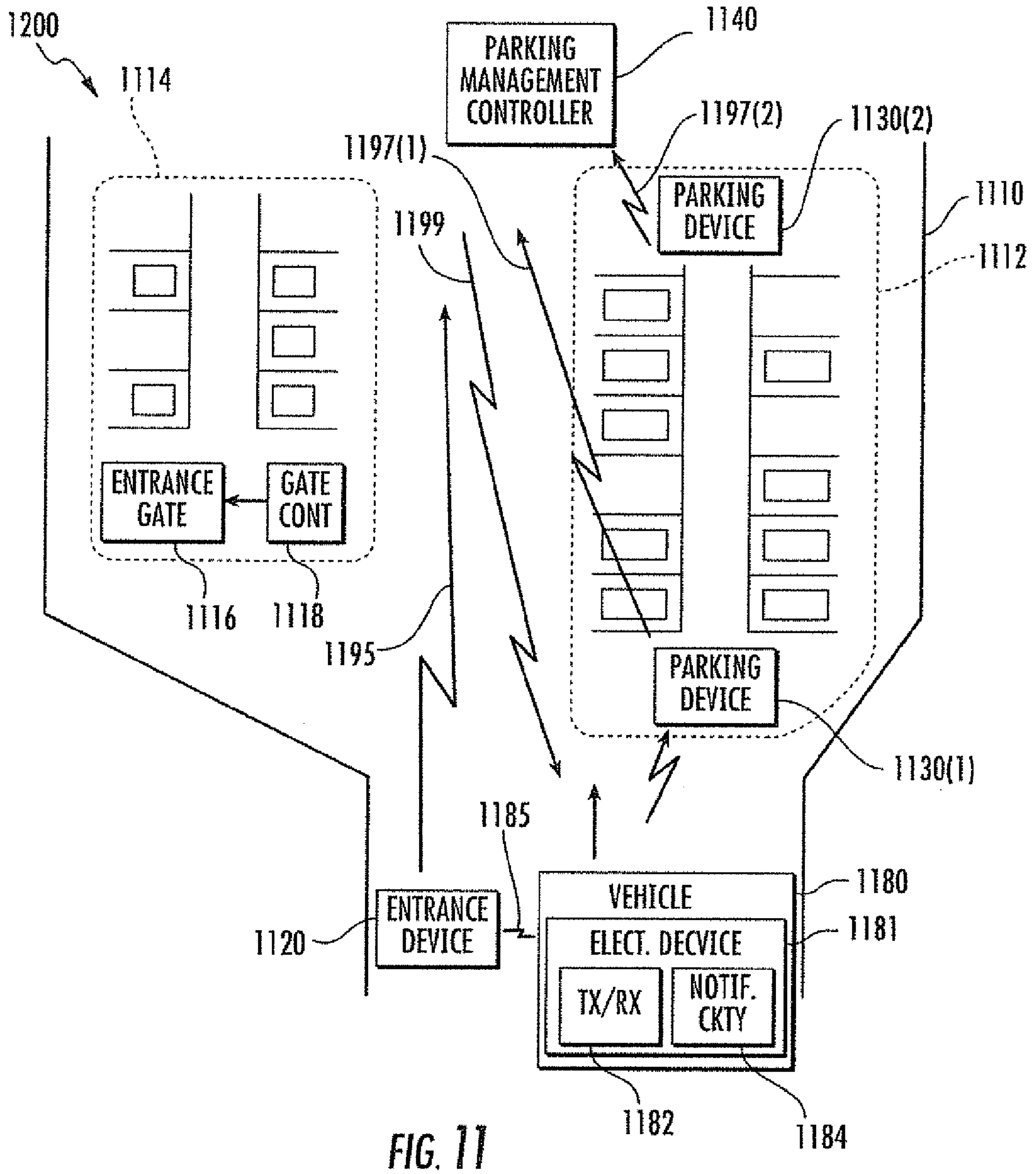
FIG. 11 is a block diagram of a parking monitoring and notification system for vehicles in accordance with the present invention.

Referring now to FIG. 11, a parking monitoring and notification system 1200 for vehicles 1800, with at least one of the vehicles carrying an electronic device 1181 comprising a transceiver 1182 configured to transmit an electronic address 1185 associated therewith, and notification circuitry 1184 coupled to the transceiver, includes at least one entrance device 1120 at an entrance to the parking lot 1110. The entrance device 1120 is configured to detect vehicles entering the parking lot 1110, and if a detected vehicle 1180 is carrying an electronic device 1181, then the electronic address 1185 associated therewith is detected. The entrance device 1120 then transmits an electronic address signal 1195 for each detected electronic address 1185.

Parking devices 1130 are spaced apart within a designated parking area 1112 of the parking lot 1110. As illustrated in FIG. 11, a first parking device 1130(1) is on one side of the designated lot 1112, and a second parking device 1130(2) is on the opposite side of the designated parking area 1112 lot. The pair of parking devices 1130(1), 1130(2) advantageously keep track of vehicles entering and leaving the designated parking area 1112.

Each parking device 1130 is configured to detect vehicles 1180 entering and leaving the designated parking area 1112, and transmit a parking detection signal 1197(1) or 1197(2) for each vehicle 1180 entering and leaving the designated parking area. A parking management controller 1140 receives the electronic address signal 1195 from the entrance device 1120, and also receives the respective parking detection signals 1197(1), 1197(2) from the parking devices 1130(1), 1130(2).

The parking management controller 1140 determines a capacity of open parking spots in the designated parking area 1112 based on the received parking detection signals 1197(1), 1197(2), and transmits a parking information signal 1199 to the transceiver 1182 of the electronic device 1181 that transmitted the electronic address 1185. The parking information signal 1199 is used to provide parking information to a driver of the vehicle 1180 via the notification circuitry 1184 coupled to the transceiver 1182.

The electronic address signal 1185 may comprise a MAC address. The notification circuitry in the electronic circuitry 1181 includes a display, with the parking information being provided to the driver by at least one of a text message, an image message and a video message. In addition too, or alternatively, the notification circuitry 1181 includes a speaker, with the parking information being provided to the driver as an audio message. The parking information may include at least one of how many open parking spots are available, which rows have open parking spots, and which particular spot is available for parking.

The parking management controller 1140 is further configured to receive the entrance detection signals 1195 from the entrance device 1120, and determine a total number of vehicles entering the entrance to the parking lot 1110.

Although not illustrated, the parking monitoring and notification system 1200 may include at least one relay hub to relay the electronic address signals 1195 and the parking detection signals 1197(1), 1197(2) from the entrance device 1120 and from the parking devices 1130(1), 1130(2) to the parking management controller 1140. In addition, the parking monitoring and notification system 1200 may include at least one parking message dissemination device to relay the parking information signal 1199 from the parking management controller 1140 to the vehicles 1180 carrying the electronic devices 1181. For large parking lots, the parking devices 1130 may be configured as a mesh network, with each parking device comprising a transceiver configured to relay the parking detection signals 1197 from one adjacent parking device 1130 to another adjacent parking device.

The transceiver in the electronic device may include a Bluetooth transceiver, and the transceiver in each parking device may include a Bluetooth transceiver, and the entrance device may also include a Bluetooth transceiver to detect the electronic address from the electronic device and to transmit the electronic address signal.

Each parking device includes a vehicle proximity detector for detecting the vehicles traveling within the parking lot, and a transceiver for transmitting the parking detection signals 1197. The electronic address from the electronic device 1181 may be pre-registered with the parking management controller 1140.

In addition, one of the designated parking areas 1114 may include an entrance gate 1116 associated with the designated parking area, and a gate controller 1118 operatively coupled to the gate. The gate controller 1118 is configured to operate the gate based on detection of the electronic address 1185 from the electronic device that is pre-registered with the parking management controller 1140. This advantageously allows special access parking to be controlled without requiring the driver to present a gate pass.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included as readily appreciated by those skilled in the art.

That which is claimed is:

1. A traffic monitoring and notification system for vehicles, with a portion of the vehicles each carrying an electronic device comprising a transceiver configured to transmit an electronic address associated therewith, and notification circuitry coupled to the transceiver, the traffic monitoring and notification system comprising:

- a plurality of road devices to be spaced apart and fixed along a surface of a road, each road device comprising
  - a vehicle proximity detector configured to detect vehicles traveling on the road,
  - a transceiver configured to determine if each detected vehicle is carrying an electronic device, and if so, then detect the electronic address associated therewith,
  - a controller coupled to said vehicle proximity detector and configured to provide for transmission a vehicle detection signal based on each detected vehicle, and coupled to said transceiver and configured to provide for transmission an electronic address signal based on each detected electronic address; and
- a traffic management controller configured to
  - receive the vehicle detection signals and the electronic address signals from said plurality of road devices,
  - determine a traffic pattern of the vehicles on the road based on the vehicle detection signals, and
  - transmit a respective travel notification signal to the transceiver of each electronic device transmitting the electronic address associated therewith, with the travel notification signal being used to provide travel information to a driver via the notification circuitry coupled to the transceiver.

2. The traffic monitoring and notification system according to claim 1 wherein said traffic management controller is further configured to determine a speed of each detected vehicle carrying an electronic device based on the received electronic address signals associated therewith.

3. The traffic monitoring and notification system according to claim 1 wherein the electronic address signal comprises a MAC address.

4. The traffic monitoring and notification system according to claim 1 wherein the notification circuitry comprises a display, with the travel notification being provided to the driver by at least one of a text message, an image message and a video message.

5. The traffic monitoring and notification system according to claim 1 wherein the notification circuitry comprises a speaker, with the travel notification being provided to the driver as an audio message.

6. The traffic monitoring and notification system according to claim 1 wherein the travel information comprises at least one of travel times, traffic delays, lane closures, route detours, and evacuation routes.

7. The traffic monitoring and notification system according to claim 1 further comprising at least one relay hub configured to relay the vehicle detection signals and the electronic address signals from said plurality of road devices to said traffic management controller.

8. The traffic monitoring and notification system according to claim 1 further comprising at least one traffic notification dissemination device configured to relay the travel notification signals from said traffic management controller to each detected vehicle carrying an electronic device.

9. The traffic monitoring and notification system according to claim 1 wherein said plurality of road devices is configured as a mesh network, with each road device comprising a transceiver configured to relay the vehicle detection signals and the electronic address signals from one adjacent road device to another adjacent road device.

10. The traffic monitoring and notification system according to claim 9 wherein the transceiver in each electronic device comprises a Bluetooth™ transceiver; and wherein said transceiver in each road device comprises a Bluetooth™ transceiver.

11. The traffic monitoring and notification system according to claim 1 further comprising at least one traffic signal head associated with at least one traffic signal for control thereof, with said traffic signal head being placed at the road with said plurality of road devices; and wherein said traffic management controller is further configured to operate said at least one traffic signal head based on the received vehicle detection signals and the electronic address signals.

12. The traffic monitoring and notification system according to claim 1 wherein the electronic address associated with at least one of the electronic devices is pre-registered with said traffic management controller.

13. The traffic monitoring and notification system according to claim 1 wherein each road device is configured to operate based on solar power.

14. A method for operating a traffic monitoring and notification system for vehicles, with a portion of the vehicles each carrying an electronic device comprising a transceiver configured to transmit an electronic address associated therewith, and notification circuitry coupled to the transceiver, the method comprising:

- positioning a plurality of road devices to be spaced apart and fixed along a surface of a road, with each road device comprising a vehicle proximity detector, a transceiver and a controller coupled to the vehicle proximity detector and to the transceiver;
- operating each road device to
  - detect via the vehicle proximity detector vehicles traveling on the road,
  - determine via the transceiver if each detected vehicle is carrying an electronic device, and if so, then detect the electronic address associated therewith,
  - transmit via the controller coupled to the transceiver a vehicle detection signal based on each detected vehicle, and transmit via the controller coupled to the transceiver an electronic address signal based on each detected electronic address; and operating a traffic management controller to receive the vehicle detection signals and the electronic address signals from the plurality of road devices, determine a traffic pattern of the vehicles on the road based on the vehicle detection signals, and transmit a respective travel notification signal to the transceiver of each electronic device transmitting the electronic address associated therewith, with the travel notification signal being used to provide travel information to a driver via the notification circuitry coupled to the transceiver.

15. The method according to claim 14 further comprising operating the traffic management controller to determine a speed of each detected vehicle carrying an electronic device based on the received electronic address signals associated therewith.

16. The method according to claim 14 wherein the electronic address signal comprises a MAC address.

17. The method system according to claim 14 wherein the notification circuitry comprises a display, with the travel notification being provided to the driver by at least one of a text message, an image message and a video message.

18. The method according to claim 14 wherein the notification circuitry comprises a speaker, with the travel notification being provided to the driver as an audio message.

19. The method according to claim 14 wherein the travel information comprises at least one of travel times, traffic delays, lane closures, route detours, and evacuation routes.

20. The method according to claim 14 wherein the traffic monitoring and notification system further comprises at least one relay hub configured to relay the vehicle detection signals and the electronic address signals from the plurality of road devices to the traffic management controller.

21. The method according to claim 14 wherein the traffic monitoring and notification further comprises at least one traffic notification dissemination device configured to relay the travel notification signals from the traffic management controller to each detected vehicle carrying an electronic device.

22. The method according to claim 14 wherein the plurality of road devices is configured as a mesh network, with each road device comprising a transceiver configured to relay the vehicle detection signals and the electronic address signals from one adjacent road device to another adjacent road device.

23. The method according to claim 14 wherein the electronic address associated with at least one of the electronic devices is pre-registered with the traffic management controller.

* * * * *